(12) United States Patent
Lin

(10) Patent No.: US 6,560,190 B1
(45) Date of Patent: May 6, 2003

(54) CD-RW OPC ALGORITHM TO MINIMIZE STATISTICAL FLUCTUATIONS IN POWER LEVEL

(75) Inventor: Xiao Lin, San Jose, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 311 days.

(21) Appl. No.: 09/678,948

(22) Filed: Oct. 3, 2000

(51) Int. Cl.[7] .................................................. G11B 7/00
(52) U.S. Cl. ...................................................... 369/116
(58) Field of Search ............................... 369/116, 47.5, 369/47.55

(56) References Cited

U.S. PATENT DOCUMENTS 5,793,737 A * 8/1998 Den Boef ................... 369/116

* cited by examiner

Primary Examiner—Nabil Hindi
(74) Attorney, Agent, or Firm—John F. Schipper

(57) ABSTRACT

Method and system for estimating an optimal power level for writing on a compact disk. Measured values $m(P_i)$ of a modulation amplitude are approximated by a continuous function $m(P)=1-A/(P-P0+B)^C$ of power level P, where $C=1$ and $B=A$, and the parameter A is to be determined, or where all three parameters A, B and C are to be determined. A selected derivative of modulation amplitude, $\gamma=(P/m(P)\cdot(dm/dP)$ is computed and analyzed to estimate a value of power level P corresponding to a specified value of $\gamma$.

22 Claims, 1 Drawing Sheet

CD-RW OPC ALGORITHM TO MINIMIZE STATISTICAL FLUCTUATIONS IN POWER LEVEL

FIELD OF THE INVENTION

This invention relates to an algorithm for estimation of parameters for an optimum power level for a write process in a CD-RW OPC operation.

BACKGROUND OF THE INVENTION

In a CD-RW OPC procedure for writing information on a CD-RW disk, it is desirable, if not necessary, to determine an optimum power level for the write process. Reference power level and other parameters are provided for by the CD-RW disk manufacturers as part of the ATIP (Absolute Time In Pregroove) information. In order to estimate optimum power, several frames are written in the PCA (Program Calibration Area), using different laser power settings that are selected according to the reference power level value(s) provided. The written frames are then read back, using read power, by measuring reflected power $I_{11}$ and theoretical maximum power $I_{top}$ for each frame and estimating the modulation amplitude as $$m = I_{11}/I_{top}. \tag{1}$$

The calculated value m will vary with the power level P, and a smooth curve is fitted to the values of m calculated for each applied power level P. From the fitted curve of m versus P, a normalized slope $\gamma$, defined as $$\gamma(P) = d(\ln\{m(P)\})/d(\ln\{P\}), \tag{2}$$

is computed and used to estimate a power P whose corresponding slope value $\gamma(P)$ is closest to the known slope value for the present target, provided by the disk manufacturer.

Because of the nature of the firmware, complex calculations of the values for $\gamma(P)$ must often be avoided. What is needed is a method of estimating a curve for the modulation amplitude m(P) and for the normalized slope $\gamma(P)$ that determines relevant curve parameters using relatively few measured data values and using only a few computations, but is relatively robust against statistical fluctuations in data measurements.

SUMMARY OF THE INVENTION

These needs are met by the invention that, in one embodiment, provides a three-step process for estimating parameters for a modulation amplitude curve m(P), using only simple arithmetic operations. In this embodiment, the modulation amplitude m(P) is estimated using a three-parameter function, namely m(P)=C+A/(B+P), and the values of the parameters A, B and C are estimated using physical arguments and measured data values. The ultimate form of the modulation amplitude m(P) in this embodiment becomes $m(P)=1-A\{A+(P-P0)\}^{-1}$, where P0 is a minimum power level value, below which the laser power is insufficient to set down a "mark" on the CD-RW disk and A is an adjustment parameter used to approximate one or more measured data values.

DESCRIPTION OF BEST MODES OF THE INVENTION

Figure 1:
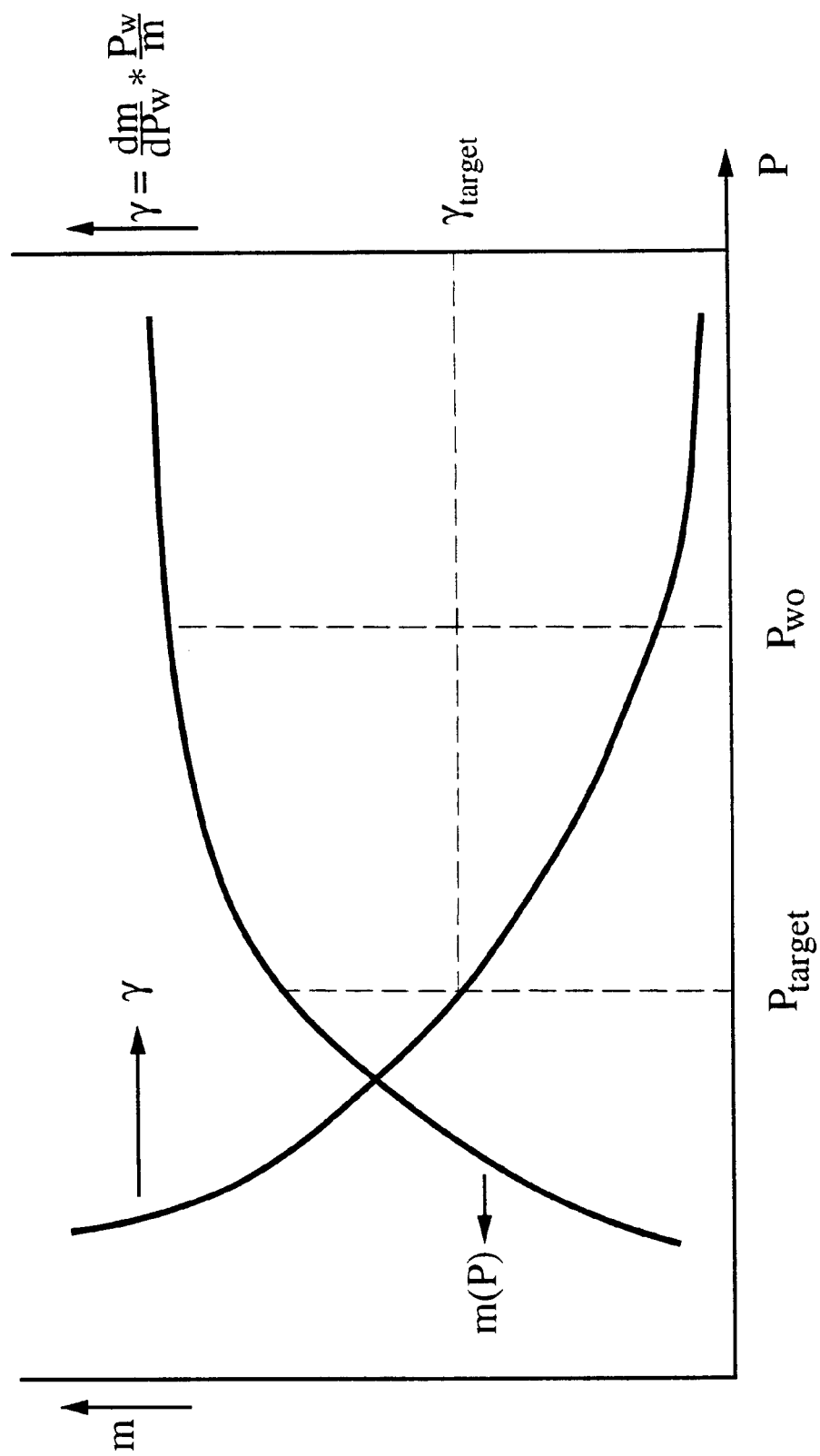
FIG. 1 is a graphical view of modulation amplitude m(P) and normalized derivative $\gamma$ as functions of power level P.

From the results of experiments, a reasonably accurate relationship between the modulation amplitude m and the laser power P used for a write process is $$m(P) = C + A/(P+B), \tag{3}$$

where A, B ad C are as yet undetermined parameters. The maximum modulation amplitude m(P) is 1.0, and m(P) is non-negative. Three selected measured data points ($P_i$, $m(P_i)$) can be used to solve for the parameters A, B and C, but a straightforward approach is often not robust or resistant to statistical fluctuations in the measurements.

The modulation amplitude m(P) is a ratio $I_{11}/I_{top}$, with $0 \leq I_{11} \leq I_{top}$, where $I_{11}$ is peak-to-peak value of the lowest fundamental frequency (196 kHz) of an HF signal. The modulation amplitude m(P) approaches its maximum value as P increases without limit so that the choice $$C = 1 \tag{4}$$

is physically reasonable. At the other end of the power spectrum, as power level P is decreased, a known or determinable (maximum) threshold power level, P=P0, is reached at which this power level is insufficient to write a "mark" on the CD-RW disk; this corresponds to a modulation amplitude $m(P) \leq 0$. Equation (3) is rewritten as $$m(P) = 1 - A/(P - P0 + B'), \tag{5}$$

and one determines that m(P=P0)=0 if B'=A. The expression for modulation amplitude m(P) is reduced to $$m(P) = 1 - A/(P - P0 + A) = (P - P0)/(P - P0 + A). \tag{6}$$

The parameter A will be determined from a comparison of Eq. (6) with a set S of one or more data measurements $(P_i-P0, 1/m(P_i)) = (x_i, 1/m_i)$, with $x_i=P_i-P0>0$, not including any power level for which $x_i=P_i-P0 \leq 0$. Consider an error function $\epsilon1(A)$ defined by $$\epsilon1(A) = \sum_{i \in I} ((1/m_i) - (x_i + A)/x_i)^2 = \sum_{i \in I} ((1/m_i) - 1 - A/x_i)^2, \tag{7}$$

where the set I of integers corresponds to the selected set S of data measurements. Minimizing the error function $\epsilon1(A)$ with respect to the choice of the parameter A yields $$A = A1 = \sum_{i \in I} ((1/m_i) - 1)(1/x_i) \Big/ \sum_{j \in I} (1/x_j)^2. \tag{8}$$

These computations can be generalized by defining a weighted error function $$\epsilon2(A) = \sum_{i \in I} w(x_i)((1/m_i) - 1 - A/x_i)^2, \tag{9}$$

where $w(x_i)$ is a selected non-negative weight function of the variable $x = x_i$ ($\geq 0$) satisfying $w(x=0)=0$, for example, $w(x) = x^k$ with k is a selected positive number. With the choice of error function $\epsilon2(A)$, the parameter A is now determined from $$A = A2 = \sum_{i \in I} w(x_i)((1/m_i) - 1)(1/x_i) \Big/ \sum_{j \in I} w(x_j)/x_j^2. \quad (10)$$

A third determination of the parameter A uses a single selected measured data value $(P_i - P0, m(P_i)) = (x_i, m_i)$ and Eq. (6):

$$A = A3 = x_i(1 - m_i)/m_i. \quad (11)$$

This determination is, however, susceptible to statistical fluctuations in the measurements.

A fourth determination of the parameter A uses a weighted average of modulation amplitude values in Eq. (11) to estimate A:

$$\sum_{i \in I} y(x_i)/m(P_i) = \sum_{i \in I} \{1 + A/x_i\}, \quad (12)$$

$$A = \sum_{i \in I} y(x_i)(1 - m(P_i))/m(P_i) \Big/ \sum_{j \in I} y(x_j)/x_j, \quad (13)$$

where $y(x_i)$ is a suitable non-negative weight function. The fourth method reproduces the third method if all but one of the weight function values $y(x_i)$ are chosen to be 0.

Determination of the parameter value A=A1 or A=A2 or A=A3 or A=A4 requires only simple addition, subtraction, multiplication and division operations. The choice A=A1 or A=A2 or A=A3 or A=A4 is then used in the expression, Eq. (6), for the modulation amplitude m(P).

After the parameters A, B and C are determined in Eq. (3), or the parameter A in Eq. (5) is determined, an optimal power level is estimated, one for which a selected derivative satisfies $$\{P/m(P)\}\{dm/dP\} = \gamma, \quad (14)$$

where the exponent $\gamma (\approx 0.5-2)$ is specified. Where the modulation amplitude m(P) satisfies Eq. (5), Eq. (12) becomes $$\gamma = A \cdot P / \{(P-P0)(P-P0+A)\}, \quad (15)$$

which leads to a quadratic equation with solutions $$P - P0 = \{-A(1-1/\gamma) \pm [A^2(1-1/\gamma)^2 + 4 \cdot A \cdot P0/\gamma]^{1/2}\}/2. \quad (16)$$

If $\gamma = 1$, the solution reduces to $$P - P0 = \pm \sqrt{(A \cdot P0)}. \quad (17)$$

Although an exact solution of Eq. (14) can be determined for the modulation amplitude M(P) in Eq. (6), the time and computing power consumed in computing a square root, as in Eq. (16), may be more than the enhanced accuracy is worth. In this instance, a sequence of two or more normalized derivative values, $$\gamma_i = \gamma(P_i) = A \cdot P_i / \{(P_i - P0)(P_i - P0 + A)\}, \quad (18)$$

are computed for selected values of the power level $P_i$, and the measured power level, $P = P_{i,g}$, that produces a gamma value $\gamma_i$ in Eq. (18) that is closest to the target value, $\gamma = \gamma_{target}$, is accepted as an optimal power level. Because the normalized derivative $\gamma$ defined in Eq. (15) is strictly monotonically decreasing as the power level P increases, it is sufficient to find two consecutive power levels, $P = P_k$ and $P = P_{k+1}$, in a sequence that satisfy $$\gamma(P_1) < \gamma(P_2) < \ldots < \gamma(P_k) \leq \gamma_{target} < \gamma(P_{k+1}) < \ldots < \gamma(P_M), \quad (19)$$

and to estimate an optimal power level as $$P_{opt} = P_k, \text{ if } \gamma_{target} - \gamma(P_k) < \gamma(P_{k+1}) - \gamma_{target} = P_{k+1} \text{ if } \gamma_{target} - \gamma(P_k) > \\ \gamma(P_{k+1}) - \gamma_{target} = (P_k + P_{k+1})/2 \text{ if } \gamma_{target} - \gamma(P_k) = \gamma(P_{k+1}) - \gamma_{target}. \quad (20)$$

More generally, if $\gamma(P_k) \neq \gamma(P_{k+1})$, one can estimate an optimal power level by $$P_{opt} = P_{k+1} - (P_{k+1} - P_k)\{\gamma_{target} - \gamma(P_{k+1})\}/\{\gamma(P_k) - \gamma(P_{k+1})\}, \quad (21)$$

which assumes that $\gamma(P)$ varies approximately linearly between $P = P_k$ and $P = P_{k+1}$. Equation (21) corresponds to use of a convex combination $$P_{opt} = \alpha \cdot P_k + (1-\alpha) \cdot P_{k+1} (0 \leq \alpha \leq 1), \quad (22)$$

where $\alpha$ is chosen according to the relation $$\alpha = \{\gamma_{target} - \gamma(P_{k+1})\}/\{\gamma(P_k) - \gamma(P_{k+1})\}. \quad (23)$$

FIG. 1 graphically illustrates the modulation amplitude m(P) and the normalized derivative $\gamma$ as functions of power level P and indicates a representative optimal power level, corresponding to a target value of $\gamma$.

In another embodiment, the modulation amplitude m(P) is expressed as in the form $$h(P) = 1 - m(P) = A'/(P - P0 + B')^C, \quad (24)$$

where A', B' and C' are as yet undetermined parameters. It is assumed that a set S' of at least three distinct measured data values $(h(P_i), P_i - P0) = (h_i, x_i)$ (i=1, 2, 3) is available, including $x_i = P_i - P0 = 0$, if desired. A ratio of logarithms of measurements, $$C' = \ln\{h(P_i)/h(P_j)\}/\ln\{(x_j + B'')/(x_i + B')\}, \quad (25)$$

determines the parameter C', once the value of the parameter B' is determined. The value B' is determined using the ratios $$\ln\{h(P_3)/h(P_1)\}/\ln\{h(P_3)/h(P_2)\} = \ln\{1 - (x_3 - x_1)/B''\}/ \\ \ln\{1 - (x_3 - x_2)/B''\}, \quad (26)$$

$$B'' = x_3 + B'. \quad (27)$$

Assume, for definiteness, that $x_1 < x_2 < x_3$. The quantity h(P) is strictly monotonically decreasing as P increases so that the right hand ratio $$\ln\{h(P_3)/h(P_1)\}/\ln\{h(P_3)/h(P_2)\}$$

in Eq. (20) is positive. As the quantity B'' increases from B''=$x_3 - x_2$ to larger values, the right hand ratio in Eq. (24) continuously decreases from $+\infty$ toward 0; and the right hand ratio becomes equal to the left hand ratio in Eq. (26) for precisely one value, B''=B0'', of the quantity B''=$x_3$+B'. The value B''=B0'' can be found from Eq. (27) using a Newton-Raphson or other mathematical approach to determine the unique "zero solution" of Eq. (26). Once the value B0'' is estimated, the value B'=B0''-$x_3$ is determined from Eq. (27), and the value of the parameter C' is determined from Eq. (19). The value of the parameter A is then determined from Eq. (26):

$$A = h(Pi) \cdot (P_i - P0 + B')^C. \quad (28)$$

This approach is more complex than the first embodiment but offers the advantage that the inverse power C' is not required to be 1 but is determined from the measured data values.

Determination of an optimal power level, using Eq. (12), begins with the relation $$A' \cdot C' \cdot P/(P-P0+B')\{(P-P0+B')^{C'}-A'\}=\gamma. \quad (29)$$

Equation (24) can be re-expressed in terms of dimensionless quantities as $$A' \cdot C' \cdot (B'')^{-(C'+1)} \cdot (y+P0/B')/(y+1)\{(y+1)^{C'}-A'/(B')^{C'}\}=\gamma, \quad (30)$$

$$y=(P-P0)/B'. \quad (31)$$

For a general exponent C', Eq. (26) or Eq. (30) must be solved numerically to determine an optimal power level $P=P0+B' \cdot y$.

What is claimed is:

1. A method of estimating an optimal power level for writing on a compact disk, the method comprising:

measuring one or more values of a modulation amplitude $m(P=P_i)$ associated with laser writing on a compact disk, and a corresponding power level value $P=P_i$ used for the writing;

estimating at least one power level value, $P=P0$, for which the modulation amplitude is 0; and estimating the modulation amplitude $m(P)$ as a continuous, monotonically increasing function the power level P, with an upper limit of 1, and as a function of at least one undetermined parameter A, and estimating the value of A using at least one of the measured values of the modulation amplitude.

2. The method of claim 1, further comprising estimating said modulation amplitude as $$m(P)=1-A/(P-P0+A)$$

for said power level P at least equal to said power level value P0.

3. The method of claim 2, wherein said process of estimating said value of said parameter A comprises:

providing one or more values $m(P_i)$ of said modulation amplitude corresponding to values $P=P_i$ of said power level; and minimizing a selected error function $$\epsilon 2(A) = \sum_i w(P_i - P0)\{(1/m(P_i)) - 1 - A/(P_i - P0)\}^2,$$

where $w(P_i-P0)$ is a selected non-negative weight function that depends upon the value $P_i-P0$, to estimate said value of said parameter A.

4. The method of claim 3, wherein said process of estimating said value of said parameter A further comprises choosing said parameter value A to be $$A = \sum_i w(P_i - P0)$$

$$\{(1/m(P_i)) - 1)/((P_i - P0)\} \bigg/ \sum_j w(P_j - P0)/(P_j - P0)^2.$$

5. The method of claim 2, wherein said process of estimating said value of said parameter A comprises:

estimating said value A as $$A = \sum_i y(P_i - P0)(1 - m(P_i))/m(P_i) \bigg/ \sum_j y(P_j - P0)/(P_j - P0),$$

where $y(P_i-P0)$ is a selected non-negative weight function that depends upon the variable $P_i-P0$.

6. The method of claim 2, further comprising:

estimating a value of a selected quantity $(P/m(P)) \cdot (dm/dP)$, using said continuous function $m(P)$; and estimating a power level value P for which the selected quantity is equal to a selected positive value $\gamma$.

7. The method of claim 1, further comprising estimating said modulation amplitude as $$m(P)=1-A'/(P-P0+B')^{C'},$$

for said power level P at least equal to said power level value P0, where A', B' and C' are undetermined parameters, at least one of which is identified with said parameter A.

8. The method of claim 1, further comprising:

estimating a value of a selected quantity $(P/m)(P)) \cdot (dm/dP)$, using said continuous function $m(P)$; and estimating a power level value P for which the selected quantity is equal to a selected positive value $\gamma$.

9. A method of estimating an optimal power level for writing on a compact disk, the method comprising:

measuring or computing one or more values of a quantity $\gamma(P)=(P/m(P)) \cdot (dm/dP)$, where $m(P)$ is a modulation amplitude for a corresponding power level value P;

identifying two distinct power levels, $P=P_k$ and $P=P_{k+1}$, that satisfy $\gamma(P_k) \leq \gamma_{target} \leq \gamma(P_{k+1})$, where $\gamma_{target}$ is a selected value of $\gamma(P)$; and choosing a convex linear combination $\alpha \cdot P_k + (1-\alpha) \cdot P_{k+1}$ as an optimal power level, where $\alpha$ is a selected value in the range $0 \leq \alpha \leq 1$.

10. The method of claim 9, further comprising choosing said value $\alpha$ to be 1 if $\gamma_{target}-\gamma(P_k)<\gamma(P_{k+1})-\gamma_{target}$ and choosing said value $\alpha$ to be 0 if $\gamma_{target}-\gamma(P_k)>\gamma(P_{k+1})-\gamma_{target}$.

11. The method of claim 10, further comprising choosing said value $\alpha$ to be $$\alpha=\{\gamma_{target}-\gamma(P_{k+1})\}/\{\gamma(P_k)-\gamma(P_{k+1})\}.$$

12. A system for estimating an optimal power level for writing on a compact disk, the system comprising a computer that is programmed:

to provide one or more measured values of a modulation amplitude $m(P=P_i)$ associated with laser writing on a compact disk, and a corresponding power level value $P=P_i$ used for the writing;

to estimate at least one power level value, $P=P0$, for which the modulation amplitude is 0; and to estimate the modulation amplitude $m(P)$ as a continuous, monotonically increasing function the power level P, with an upper limit of 1, and as a function of at least one undetermined parameter A, and to estimate the value of A using at least one of the measured values of the modulation amplitude.

13. The system of claim 12, wherein said computer is further programmed to estimate said modulation amplitude as $$m(P)=1-A/(P-P0+A)$$

for said power level P at least equal to said power level value P0.

14. The system of claim 13, wherein said computer is further programmed to estimate said value of said parameter A by a process comprising:
   providing one or more values $m(P_i)$ of said modulation amplitude corresponding to values $P=P_i$ of said power level; and
   minimizing a selected error function $$\epsilon 2(A) = \sum_i w(P_i - P0)\{(1/m(P_i)) - 1 - A/(P_i - P0)\}^2,$$

where $w(P_i-P0)$ is a selected non-negative weight function that depends upon the value $P_i-P0$, to estimate said value of said parameter A.

15. The system of claim 14, wherein said computer is further programmed to estimate said value of said parameter A by a process that further comprises choosing said parameter value A to be $$A = \sum_i w(P_i - P0)\{(1/m(P_i)) - 1\}/((P_i - P0)\} \Big/ \sum_j w(P_j - P0)/(P_j - P0)/(P_j - P0)^2.$$

16. The system of claim 15, wherein said computer is further programmed to estimate said value of said parameter A as:

$$A = \sum_i y(P_i - P0)(1 - m(P_i))/m(P_i) \Big/ \sum_j y(P_j - P0)/(P_j - P0),$$

where $y(P_i-P0)$ is a selected non-negative weight function that depends upon the variable $P_i-P0$.

17. The system of claim 13, wherein said computer is further programmed:
   to estimate a value of a selected quantity $(P/m(P))\cdot(dm/dP)$, using said continuous function $m(P)$; and
   to estimate a power level value P for which the selected quantity is equal to a selected positive value $\gamma$.

18. The system of claim 12, wherein said computer is further programmed to estimate said modulation amplitude as $$m(P) = 1 - A'/(P - P0 + B')^{C'}$$

for said power level P at least equal to said power level value P0, where A', B' and C' are undetermined parameters, at least one of which is identified with said parameter.

19. The system of claim 18, wherein said computer is further programmed:
   to estimate a value of a selected quantity $(P/m(P))\cdot(dm/dP)$, using said continuous function $m(P)$; and
   to estimate a power level value P for which the selected quantity is equal to a selected positive value $\gamma$.

20. A system estimating an optimal power level for writing on a compact disk, the system comprising a computer that is programmed:
   to provide one or more measured or computed values of a quantity $\gamma(P)=(P/m(P))\cdot(dm/dP)$, where $m(P)$ is a modulation amplitude for a corresponding power level value P;
   to identify two distinct power levels, $P=P_k$ and $P=P_{k+1}$, that satisfy $\gamma(P_k) \leq \gamma_{target} \leq \gamma(P_{k+1})$, where $\gamma_{target}$ is a selected value of $\gamma(P)$; and
   to choose a convex linear combination $\alpha \cdot P_k + (1-\alpha) \cdot P_{k+1}$ as an optimal power level, where $\alpha$ is a selected value in the range $0 \leq \alpha \leq 1$.

21. The system of claim 20, wherein said computer is further programmed to choose said value $\alpha$ to be 1 if $\gamma_{target}-\gamma(P_k)<\gamma(P_{k+1})-\gamma_{target}$ and choosing said value $\alpha$ to be 0 if $\gamma_{target}-\gamma(P_k)>\gamma(P_{k+1})-\gamma_{target}$.

22. The system of claim 20, wherein said computer is further programmed to choose said value $\alpha$ to be $$\alpha = \{\gamma_{target}-\gamma(P_{k+1})\}/\{\gamma(P_k)-\gamma(P_{k+1})\}.$$

* * * * *